United States Patent [19]

Gorter et al.

[11] Patent Number: 4,711,672

[45] Date of Patent: Dec. 8, 1987

[54] ASPHALTIC COMPOSITION

[75] Inventors: Helen R. Gorter; Lyle E. Moran; Warren D. Robertson, all of Sarnia; Shaunalea Savard, Guelph, all of Canada

[73] Assignee: Exxon Research and Engineering Company, Florham Park, N.J.

[21] Appl. No.: 853,925

[22] Filed: Apr. 21, 1986

[51] Int. Cl.$^4$ .............................................. C08L 95/00
[52] U.S. Cl. ............................ 106/281 R; 106/273 R; 106/274
[58] Field of Search ............................ 106/273 R, 274

[56] References Cited

U.S. PATENT DOCUMENTS 2,396,669  3/1946  Auer ..................................... 106/274
2,526,537  10/1950  Camp ................................. 106/277
4,084,981  4/1978  Higuchi et al. ...................... 106/96

OTHER PUBLICATIONS

Derwent Abstract Accession No. 85-267543/43, Japanese Pat. No. 60181185, Feb. 29, 1984.
Derwent Abstract Accession No. 83-02779k/02, Japanese Pat. No. 57191043, May 21, 1981.

*Primary Examiner*—Amelia Yarbrough
*Attorney, Agent, or Firm*—Edward H. Mazer; John W. Ditsler

[57] ABSTRACT

An asphaltic composition having improved temperature susceptibility and a method of manufacturing the improved asphaltic composition are disclosed. The improvement is directed at the addition of a stabilizing agent selected from the group consisting of Group IA sulfates, Group IIB sulfates and mixtures thereof.

17 Claims, No Drawings

ASPHALTIC COMPOSITION

BACKGROUND OF THE INVENTION

The present invention is directed at an improved asphaltic composition and a method of manufacturing same. More specifically, the present invention is directed at an asphaltic composition having improved temperature susceptibility by the addition to the asphalt of certain salts.

Asphalt is a bituminous material generally comprising the bottoms from distillation processes, particularly atmospheric distillations. The atmospheric boiling point of asphalt generally is 400+° C. Because of its good hydrophobic and adhesive properties, asphalt is utilized as a binder in paving materials and as a saturant and coating in roofing shingles. However, before the asphalt can be used in shingles, the asphalt must be further processed to minimize its sensitivity to temperature changes. Without treatment the asphalt may be unacceptably brittle in winter and unacceptably soft in summer. The temperature susceptibility of asphalt has been improved by oxidizing the asphalt. The addition of about 2 weight percent of a mineral acid, such as phosphoric acid, decreases the oxidation time and permits the use of heavier, lower cost feedstocks. U.S. Pat. No. 2,762,755; British Pat. No. 916,531; and U.S. Pat. No. 3,258,419 all are directed at asphaltic compositions which are air blown and/or to which phosphoric acid has been added.

Frequently, a filler material, such as calcium carbonate, is added to the asphalt to decrease the cost of asphaltic compounds and to improve their durability. Addition of a filler is well-known in the art and is discussed in detail in Karchma L. C., Bituminous Materials: Asphalts, Tars, and Pitches, Chapter 28, Vol. II, Part 1, Interscience Publishers New York (1965) the disclosure of which is incorporated herein by reference.

However, it has been found that the addition of calcium carbonate adversely affects the temperature susceptibility of the phosphoric acid-modified asphalt. When calcium carbonate is added, the asphalt becomes softer and flows at unacceptably low temperatures. Shingles manufactured from such an asphaltic composition would be susceptible to blistering and sliding of the coating layer in service.

Accordingly, it would be desirable to provide a phosphoric acid-treated, asphalt calcium carbonate composition having improved temperature susceptibility.

It also would be desirable to provide an asphaltic composition having improved temperature susceptibility in which the improvement in temperature susceptibility is achieved at a relatively low cost and without the use of additional processing equipment.

It also would be desirable to provide a method for improving the temperature susceptibility of asphaltic compounds without unduly increasing the processing time of the asphalt.

The present invention is directed at an asphaltic composition having improved temperature susceptibility and a method for producing same by the addition to the asphalt of a sulfate of a Group IA or Group IIB, preferably selected from the group consisting of sodium sulfate, zinc sulfate and mixtures thereof.

SUMMARY OF THE INVENTION

The present invention is directed at an asphaltic composition having improved temperature susceptibility comprising asphalt and a Group IA and/or Group IIB sulfate. The sulfate preferably is selected from the group of stabilizing agents consisting of sodium sulfate, zinc sulfate and mixtures thereof.

The present invention also is directed at a method for producing an improved asphaltic composition, said method comprising admixing a stabilizing agent selected from the group consisting of Group IA and Group IIB sulfates and mixtures thereof.

In a preferred embodiment a mineral acid, such as phosphoric acid is admixed with the asphalt, and the asphalt is oxidized prior to the addition of the stabilizing agent. The phosphoric acid concentration preferably ranges between about 0.1 and about 4 weight percent of the asphalt. A filler, such as calcium carbonate, preferably is added after the addition of the sulfate. The filler concentration may range between about 1 and about 65 weight percent of the asphalt, preferably between about 50 and about 60 weight percent.

The stabilizing agent concentration may range between about 0.1 and about 12 weight percent of the asphalt, preferably between about 0.5 weight percent and about 10 weight percent. The stabilizing agent is a Group IA and/or Group IIB sulfate preferably selected from the group consisting of zinc sulfate, sodium sulfate, and mixtures thereof. The weight percent of the stabilizing agent used will be dependent, in part, on the equivalent weight of the stabilizing agent. The preferred concentration of zinc sulfate ranges between about 0.5 and about 5 wt. %, whereas the preferred concentration of sodium sulfate ranges between about 1 and about 10 wt. %

DETAILED DESCRIPTION OF THE INVENTION

The present invention is directed at an improved asphaltic compound and a method for making same. In the manufacture of the improved asphalt, an asphaltic material having a boiling point of 400+°C. typically is used. To minimize creep resistance and improve weatherability, the asphalt typically is air blown at a temperature ranging between about 200° C. to about 300° C., preferably about 250° C. to about 270° C. for about 6 to about 24 hours to partially polymerize the asphalt by a process known as oxidative dehydrogenation. This process is well-known in the art and is described in detail by L. W. Corbett, in Bituminous Materials: Asphalts, Tars and Pitches, Interscience Publishers, New York (1965) and by E. J. Barth in Asphalt Science and Technology, Gordon and Breach Science Publishers, New York (1968) the disclosures of which are incorporated herein by reference. To further moderate the change in the asphalt viscosity with temperature, mineral acids such as phosphoric acid, frequently are added to the asphalt prior to or during the air blowing process. The amount of mineral acid, such as phosphoric acid, which is added to the asphalt, may range between about 0.1 weight percent and 4 weight percent based on the asphalt content, preferably between about 1.0 and about 2.5 weight percent. The addition of phosphoric acid to asphalt is known. For example, German Pat. No. 2,255,173 disclosed the addition of phosphoric acid to air-blown asphalts.

Frequently, finely divided solid material, such as calcium carbonate, and other inorganic salts may be added to the asphalt as an extender. A particularly preferred compound is calcium carbonate, or powdered limestone, which is readily available, relatively inexpensive and finely divided. The filler, or extender may comprise between about 1 and about 65 weight based on the asphalt content, preferably between about 50 and about 60 weight percent. However, the addition of a filler, such as calcium carbonate, may soften phosphoric acid modified asphalt excessively, thereby rendering the asphalt unsuitable for certain applications, such as roofing shingles. Shingles having excessive softening would be susceptible to blistering and to movement of the asphaltic coating.

It has been found that the addition of a Group IA and/or Group IIB sulfate, preferably selected from the group consisting of zinc sulfate and sodium sulfate, to the asphaltic composition provides a firmer, more stable coating having a higher softening point. The filled product should have a softening point ranging between about 100° C. and about 130° C., preferably between about 102° C. and about 110° C. Higher softening points indicate a product which is too stiff, while softening points lower than the ranges set forth indicate a product which may flow in use. The penetration point of the filled product should range between about 4 mm/10 and about 14 mm/10, preferably between about 6 mm/10 and about 12 mm/10.

The utility of the present invention is illustrated by the following comparative examples and examples.

COMPARATIVE EXAMPLE I

A conventional asphaltic blend comprising 78.2 weight percent Cold Lake asphalt having a penetration of 85–95 mm/10 as determined by ASTM D5, was blended with 21.8 weight percent paraffinic distillate to make a product having a flash point of 270° C. The blend was air blown at 50 L/h/kg air rate at 260° C. for 3.5 hours to a 102° C. softening point as determined by ASTM test D-36. As shown in Table I, the asphaltic blend had a penetration at 25° C. of 19 mm/10.

COMPARATIVE EXAMPLE II

A blend similar to that of Comparative Example I was utilized with calcium carbonate added after air blowing. The calcium carbonate was heated to 175° C. prior to addition, and was added over a 30 minute period to the asphalt, which was maintained at 200° C. to minimize asphalt cooling. The limestone comprised approximately 60 weight percent of the final asphaltic composition. The softening point was determined to be 115° C., and the penetration at 25° C. was measured to be 9 mm/10.

COMPARATIVE EXAMPLE III

The addition of phosphoric acid to the asphalt permits the use of asphalt without the necessity for adding paraffin distillate. In this Comparative Example Cold Lake asphalt having a penetration of 85–95 mm/10 was maintained at 260° C. and air blown at 50 L/hr/kg air rate for 1 hour afterwhich 7.2 weight percent of a solution comprising 25 weight percent phosphoric acid and 75 weight percent water was added. The mixture then was air blown for an additional 2 hours. The softening point was measured to be 101° C., and the penetration at 25° C. was measured to be 19 mm/10.

COMPARATIVE EXAMPLE IV

A sample of Cold Lake residuum similar to that utilized in Comparative Example III also was utilized in this Comparative Example. The resid was air blown at a rate of 50 L/hr/kg for 1 hour at 260° C. after which 7.2 weight percent of a solution comprising 25 weight percent phosphoric acid and 75 weight percent water was added. The mixture then was air blown for an additional 2 hours at 260° C. The temperature of the asphaltic composition then was lowered to 200° C., while limestone filler maintained at 175° C. was added to the asphaltic composition over a 30 minute period until the filler comprised approximately 60 weight percent of the asphaltic composition. The softening point was measured to be 100° C., and the penetration at 25° C. was measured to be 9 mm/10.

COMPARATIVE EXAMPLE V

An asphaltic sample similar to that of Comparative Example I was used in this comparative example. The sample was maintained at 260° C. and air blown at a rate of 50 L/hr/kg for one hour after which 7.2 weight percent phosphoric acid solution comprising 25 weight percent phosphoric acid and 75 weight percent water was added. The asphaltic mixture was air blown at a rate of 50 L/hr/kg for an addtional two hours to produce an asphaltic composition having a softening point of 112° C. and a penetration at 25° C. of 12 mm/10. To this sample maintained at 260° C. under a nitrogen atmosphere, 3 equivalents of an aqueous solution of magnesium acetate (MgAc) was added in three separate additions of 10 minutes each, with 20 minutes between additions. The softening point was measured to be 137° C. and the penetration at 25° C. was too hard to measure. The asphalt was cooled to 200° C. and calcium carbonate, which had been heated to 175° C., was added over a 30 minute period. The softening point and penetration could not be measure because a precipitate formed which was deemed to be unsatisfactory.

COMPARATIVE EXAMPLE VI

An asphaltic sample similar to that of Comparative Example V was utilized in which 5 equivalents of calcium sulfate was added in place of magnesium acetate. The softening point prior to the addition of the calcium sulfate was 103° C. and the penetration was 15 mm/10. The calcium sulfate was added as a dry powder in 5 separate additions of 10 minutes each, with 20 minutes between additions. During each addition 1.25 wt. % calcium sulfate was added. The softening point then was measured to be 105° C. and the penetration was measured to be 13.5 mm/10 at 25° C. Calcium carbonate was added to this mixture in a manner similar to that of comparative Example V. The softening point was measured to be 108° C. and the penetration at 25° C. was 5.5 mm/10. It was noted that an undisclosed precipitate had formed. In addition, the softening point value was not considered to be satisfactory.

EXAMPLE I

A sample of Cold Lake 85/95 penetration residuum, similar to that utilized in Comparative I also was used in this example. The sample was maintained at 260° C. and air blown at a rate of 50 L/hr/kg for 1 hour, afterwhich 7.2 weight percent of an aqueous phosphoric acid solution comprising 25 weight percent phosphoric acid and 75 weight percent water was added. The asphaltic mixture then was air blown at a rate of 50 L/hr/kg for an additional 2 hours to produce an asphaltic composition having the softening point of 110° C. and a penetration at 25° C. of 14 mm/10. To this sample, maintained at 260° C. under a nitrogen atmosphere, were added four separate 30.6 cc additions of aqueous 3N ZnSO$_4$.H$_2$O. Each addition was made over a period of 10 minutes, with 20 minutes between each addition period. Each addition represented the addition of about 0.8 wt. % zinc sulfate, based upon the weight of asphalt. The softening point then was measured to be 109° C., and the penetration at 25° C. was measured to be 14 mm/10. This asphaltic composition was cooled to 200° C. Calcium carbonate which had been heated to 175° C. was added over a 30 minute period. The softening point had increased to 129° C. and the penetration at 25° C. had decreased to 5 mm/10, thus demonstrating the utility of the present invention in producing a more stable asphalt having less sensitivity to temperature.

EXAMPLE II

The utility of sodium sulfate in stabilizing asphaltic compositions is demonstrated by this example. An asphaltic composition similar to that of Example I was prepared with 5 equivalents of sodium sulfate being used as a stabilization agent in place of the zinc sulfate. Each addition represented the addition of about 1.3 wt. % sodium sulfate, based upon the weight of the asphalt. The sodium sulfate was added as an aqueous solution in 5 separate additions of 10 minutes each, with 20 minutes between additions. After the final addition, calcium carbonate was added in a manner similar to that described in Example I. The softening point and penetration of the asphaltic composition prior to the sodium sulfate addition, were 101.8° C. and 10 mm/10, respectively. After the sodium sulfate addition these values were 105° C. and 9.5 mm/10, respectively. The softening point and penetration of the asphaltic composition after the addition of 60 wt. % calcium carbonate were 119° C. and 4 mm/10, respectively.

A tabulation of the softening point and penetration data for Comparative Example I-VI and Examples I and II is presented in Table I.

calcium carbonate. A solution of 3N ZnSO$_4$.H$_2$O was added in 30.6 cc additions over 10 minute periods with 20 minutes between addition periods to the asphaltic composition described in Example I. In one test, the zinc sulfate solution was added prior to the phosphoric acid addition. In other tests the zinc sulfate solution was added subsequent to the phosphoric acid addition. As shown in Table IV, the softening points and penetration were not as good as that achieved in Example I, in which the zinc sulfate solution was added subsequent to the phosphoric acid addition, but prior to the calcium carbonate addition.

TABLE IV
EFFECT OF STABILIZING AGENT ON SOFTENING POINT AND PENETRATION

| Stabilizing Agent Addition Period | Softening Point, °C. | Penetration, mm/10 |
|---|---|---|
| Prior to Phosphoric Acid Addition | 98 | 7 |
| Concurrent With Calcium Carbonate Addition | 105 | 7 |
| Subsequent to Calcium Carbonate Addition | 100 | 9 |
| Subsequent to Phosphoric Acid Addition, But Prior to Calcium Carbonate Addition | 129 | 5 |

What is claimed is:

1. An improved asphaltic composition comprising asphalt, a mineral acid, a filler and a stabilizing agent selected from the group consisting of Group IA and/or Group IIB sulfates.

2. The asphaltic composition of claim 1 wherein the stabilizing agent is selected from the group consisting of sodium sulfate, zinc sulfate and mixtures thereof.

3. The asphalt composition of claim 2 wherein the stabilizing agent comprises about 0.1 to about 12 wt. % based upon the asphalt content.

4. The asphalt composition of claim 3 wherein the stabilizing agent comprises about 0.5 to about 10 wt. %

TABLE I
EFFECT OF ADDITIVES UPON THE SOFTENING POINT AND PENETRATION OF ASPHALT

| | Comparative Example I | Comparative Example II | Comparative Example III | Comparative Example IV | Comparative Example V | Comparative Example VI | Example I | Example II |
|---|---|---|---|---|---|---|---|---|
| Asphalt Sample Starting Composition, Wt. % | | | | | | | | |
| Cold Lake Asphalt | 78.2 | 78.2 | 100 | 100 | 100 | 100 | 100 | 100 |
| Paraffin Distillate | 21.8 | 21.8 | 0 | 0 | 0 | 0 | 0 | 0 |
| Calcium Carbonate, Wt. % | 0.0 | 60.0 | 0.0 | 60.0 | 60.0 | 60.0 | 60.0 | 60.0 |
| Phosphoric Acid, Wt. % | 0.0 | 0.0 | 1.80 | 1.80 | 1.80 | 1.80 | 1.80 | 1.80 |
| MgAc Addition - Equivalents of H$_3$PO$_4$ | 0.0 | 0.0 | 0.0 | 0.0 | 3 | 0.0 | 0.0 | 0.0 |
| CaSO$_4$ Addition - Equivalents of H$_3$PO$_4$ | 0.0 | 0.0 | 0.0 | 0.0 | 0.0 | 5 | 0.0 | 0.0 |
| ZnSO$_4$ Addition - Equivalents of H$_3$PO$_4$ | 0.0 | 0.0 | 0.0 | 0.0 | 0.0 | 0.0 | 3 | 0.0 |
| Na$_2$SO$_4$ Addition - Equivalents of H$_3$PO$_4$ | 0.0 | 0.0 | 0.0 | 0.0 | 0.0 | 0.0 | 0.0 | 5 |
| Final Softening Point, °C. | 102 | 115 | 101 | 100 | 137 | 108 | 129 | 119 |
| Final Penetration at 25° C. mm/10 (100 g/5 seconds) | 19 | 9 | 19 | 9 | — (Precipitate) | 5.5 (Precipitate) | 5.0 | 4.0 |

EXAMPLE III

While the addition of the stabilizing agent concurrent with the addition of phosphoric acid, concurrent with the addition of calcium carbonate or subsequent to the addition of the calcium carbonate improves the stability of the asphalt, the greatst improvement in stabilization of the asphaltic composition is achieved where the stabilization agent is added subsequent to the addition of the phosphoric acid, but prior to the addition of the based upon the asphalt content.

5. The asphalt composition of claim 4 wherein the stabilizing agent comprises about 0.5 to about 5 wt. % zinc sulfate, based upon the asphalt content.

6. The asphalt composition of claim 4 wherein the stabilizing agent comprises about 1 to about 10 wt. % sodium sulfate, based upon the asphalt content.

7. The asphalt composition of claim 3 wherein the mineral acid comprises phosphoric acid.

8. The asphalt composition of claim 2 wherein the filler comprises calcium carbonate.

9. The asphalt composition of claim 8 wherein the filler concentration ranges between about 1 and about 65 wt. % of the total asphaltic composition.

10. A method of producing an improved asphaltic composition, said method comprising:
   A. admixing a mineral acid with asphalt;
   B. oxidizing the asphalt formed in (A);
   C. admixing a stabilizing agent selected from the group consisting of Group IA sulfates, Group IIB sulfates, and mixtures thereof with the asphalt formed in (B); and
   D. adding a filler to the asphalt formed in (C).

11. The method of claim 10 wherein the stabilizing agent is selected from the group consisting of sodium sulfate, zinc sulfate and mixtures thereof.

12. The method of claim 11 wherein the filler comprises calcium carbonate.

13. The method of claim 12 wherein the mineral acid comprises phosphoric acid.

14. The method of claim 13 wherein the asphalt is air blown prior to the addition of the phosphoric acid.

15. The method of claim 13 wherein the stabilizing agent concentration ranges between about 0.1 and about 12 wt. % of the total asphaltic composition.

16. A method for manufacturing an asphaltic composition having improved temperature stability, said method comprising:
   A. oxidizing an asphalt at a temperature ranging between about 200° C. and about 300° C.;
   B. admixing between about 0.1 weigt percent and about 4.0 weight percent phosphoric acid with the oxidized asphalt;
   C. admixing between about 0.1 weight percent and about 12 weight percent of a stabilizing agent selected from the group consisting of zinc sulfate, sodium sulfate and mixtures thereof with the asphalt; and,
   D. admixing between about 1 weight percent and about 65 weight percent calcium carbonate with the asphalt, the concentration of the additives of steps (B), (C) and (D) based on the asphalt content.

17. An asphaltic composition having improved thermal stability comprising:
   A. asphalt;
   B. about 0.1 to about 4.0 wt. % phosphoric acid;
   C. about 0.1 to about 12 wt. % of a stabilizing agent selected from the group consisting of zinc sulfate, sodium sulfate and mixtures thereof; and,
   D. about 1 to about 65 wt. % calcium carbonate, the concentration of components (B), (C) and (D) based upon the asphalt content.

* * * * *